(12) United States Patent
Niu et al.

(10) Patent No.: US 8,918,137 B2
(45) Date of Patent: *Dec. 23, 2014

(54) POWER LOADING IN MU-MIMO

(71) Applicant: Intel Corporation, Santa Clara, CA (US)

(72) Inventors: Huaning Niu, Milpitas, CA (US); Qinghua Li, San Ramon, CA (US); Honggang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,524

(22) Filed: Oct. 7, 2013

(65) Prior Publication Data

US 2014/0038661 A1 Feb. 6, 2014

Related U.S. Application Data (63) Continuation of application No. 12/845,482, filed on Jul. 28, 2010, now Pat. No. 8,554,261.

(51) Int. Cl.
*H04B 7/00* (2006.01)
*H04L 1/00* (2006.01)
*H04W 52/24* (2009.01)

(52) U.S. Cl.
CPC ........... *H04W 52/241* (2013.01); *H04L 1/0003* (2013.01); *H04L 1/0015* (2013.01); *H04L 1/0026* (2013.01); *H04L 1/0009* (2013.01)
USPC .................. 455/522; 455/69; 455/70; 455/25; 455/561; 455/562.1; 370/315; 370/316; 370/317; 370/318; 370/319

(58) Field of Classification Search
USPC ....................... 370/315–320; 455/522, 69–70, 455/444–455, 25, 63.4, 561, 562.1
See application file for complete search history.

(56) References Cited

U.S. PATENT DOCUMENTS 8,554,261 B2 10/2013 Niu et al.
2004/0063468 A1* 4/2004 Frank ............................ 455/561
(Continued)

FOREIGN PATENT DOCUMENTS

| KR | 102005002057 | 3/2005 |
| KR | 102009004266 | 4/2009 |
| WO | WO-2012015611 A1 | 2/2012 |

OTHER PUBLICATIONS

"U.S. Appl. No. 12/845,482, Non Final Office Action mailed Dec. 6, 2012", 14 pgs.
"U.S. Appl. No. 12/845,482, Notice of Allowance mailed Jun. 5, 2013", 9 pgs.
"U.S. Appl. No. 12/845,482, Response filed Apr. 8, 2013 to Non Final Office Action mailed Dec. 6, 2012", 11 pgs.

(Continued)

*Primary Examiner* — Fayyaz Alam
(74) *Attorney, Agent, or Firm* — Schwegman Lundberg & Woessner, P.A.

(57) ABSTRACT

Embodiments of a system and method for transmitting data from an access point in a multiple user multiple input multiple output (MU-MIMO) system are provided. A first indication of signal quality (ISQ) is received at the access point from a first station and a second ISQ is received from a second station. The access point sets a first power level and a first modulation and coding scheme (MCS) for transmission of a first aggregated media access control (MAC) protocol data unit (A-MPDU) to the first station as a function of the first ISQ and an amount of payload data corresponding to the first A-MPDU. The access point also sets a second power level and a second MCS for transmission of a second A-MPDU as a function of the second ISQ and an amount of payload data corresponding to the second A-MPDU.

24 Claims, 6 Drawing Sheets

(56) References Cited

U.S. PATENT DOCUMENTS

| | | |
|---|---|---|
| 2006/0067416 A1* | 3/2006 | Tirkkonen et al. ............ 375/260 |
| 2008/0132281 A1* | 6/2008 | Kim et al. .................. 455/562.1 |
| 2008/0192683 A1* | 8/2008 | Han et al. ...................... 370/329 |
| 2009/0291702 A1* | 11/2009 | Imai et al. ..................... 455/517 |
| 2009/0323842 A1* | 12/2009 | Zhang et al. .................. 375/260 |
| 2010/0118836 A1* | 5/2010 | Kazmi et al. ................. 370/336 |
| 2010/0220010 A1* | 9/2010 | Ko et al. ....................... 342/373 |
| 2010/0290548 A1* | 11/2010 | Hoshino et al. ............... 375/260 |
| 2010/0329215 A1* | 12/2010 | Wilson et al. ................. 370/331 |
| 2012/0028671 A1 | 2/2012 | Niu et al. |

OTHER PUBLICATIONS

"International Application Serial No. PCT/US2011/044246, International Preliminary Report on Patentability mailed Feb. 7, 2013", 5 pgs.

"International Application Serial No. PCT/US2011/044246, Search Report mailed Jan. 4, 2012", 3 pgs.

"International Application Serial No. PCT/US2011/044246, Written Opinion mailed Jan. 4, 2012", 3 pgs.

"Korean Application Serial No. 10-2013-7004992, Notice of Preliminary Rejection mailed Mar. 14, 2014", 5 pgs.

* cited by examiner

POWER LOADING IN MU-MIMO

PRIORITY APPLICATION

This application is a continuation of U.S. application Ser. No. 12/845,482, filed Jul. 28, 2010, now issued as U.S. Pat. No. 8,554,261, which is incorporated herein by reference in its entirety.

BACKGROUND

Multiple-user multiple-input multiple-output (MU-MIMO) systems can transmit and receive signals to/from multiple users at a single antenna array at the same time. In a MU-MIMO system, multiple signals are sent in parallel and are kept separate from one another not by modulation or coding techniques, but by transmitting (or receiving) each signal in a different (e.g., orthogonal) direction. The process of transmitting (or receiving) a signal in a specific direction using an antenna array is known as beamforming. By selecting a beam for each signal that will produce limited interference with other parallel beams, multiple signals can be transmitted or received at the same time. Beams are often calculated to be orthogonal to one another in order to minimize the interference between the beams.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In conventional systems, the lengths of a given mobile station's data stream can vary due to dynamic traffic conditions and the amount of data in the buffer. The transmission length of a given frame varies accordingly and is determined by the longest data stream. To align the terminations of the different data streams, padding bits are added to shorter data streams until all data streams have the same length. Transmission of padding bits, however, wastes transmission power since power is used transmitting bits with no information, and also increases the packet error probability. Additionally, the transmission of extra (padding) bits can add to interference caused to other data streams and co-channel networks.

In accordance with embodiments, power loading of different data streams may be used to align terminations of the data streams with minimal padding. For example, modulation and coding scheme (MCS) adjustments can be made to some or all of the data streams to get the data streams to the same length. Power loading can then be used to compensate for the changes in MCS. In particular, for data streams that are shortened by making the MCS less robust, the transmission power for the data stream can be increased to compensate for the less robust MCS. The overall power can be maintained by reducing the power level and making the MCS more robust for shorter data streams.

Figure 1:
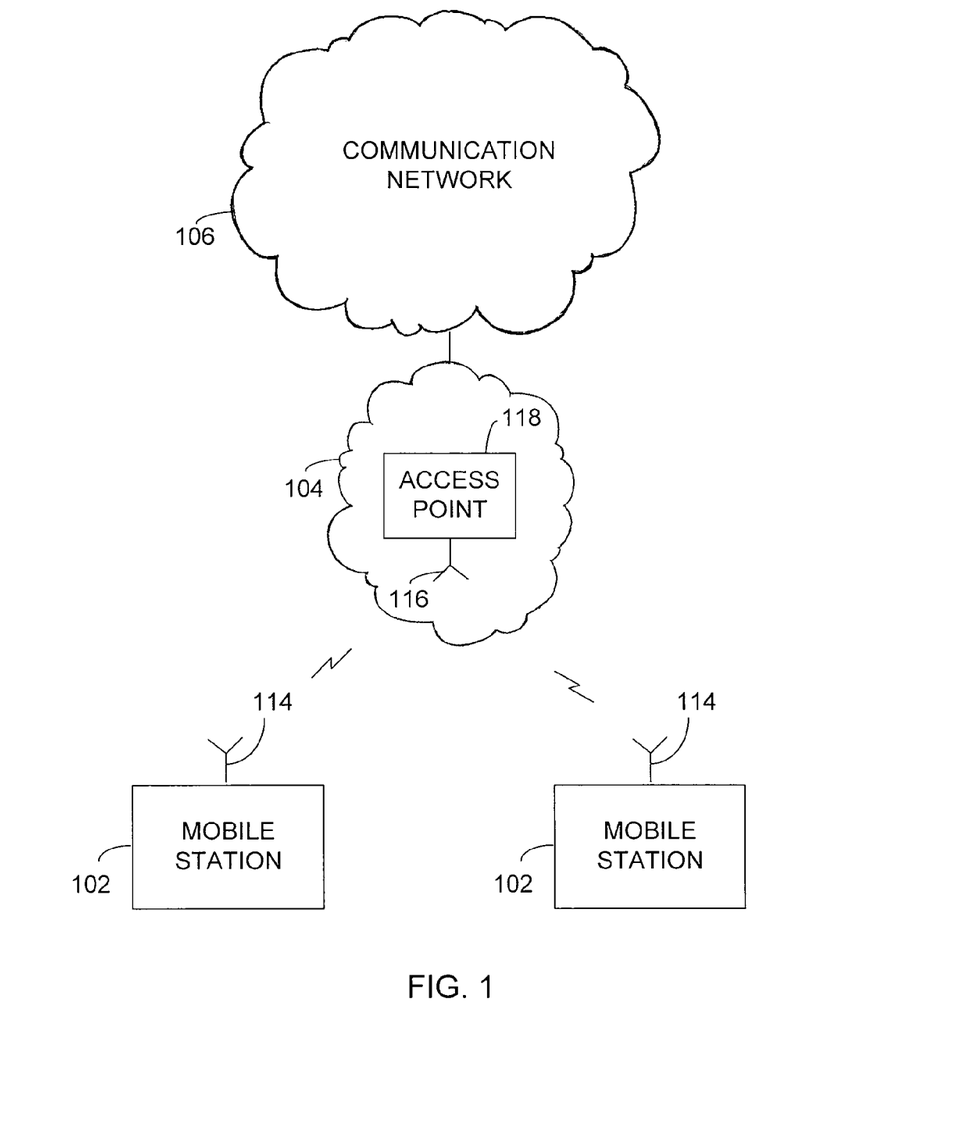
FIG. 1 illustrates an example of a wireless communication system in accordance with embodiments.

FIG. 1 illustrates an example of a wireless communication system 100. The wireless communication system 100 can include a plurality of mobile stations 102 in wireless communication with an access network 104. The access network 104 forwards information between the mobile stations 102 and another communications network 106. Communications network 106 can include the internet, a private intranet, or other network.

In an example, each mobile station 102 can include one or more antennas 114 for transmitting and receiving wireless signals to/from an access point 118 in the access network 104. The access point 118 can implement the air interface to the mobile stations 102, and can transmit and receive signals with an antenna array 116 coupled thereto. The access point 118 can be communicatively coupled to the communications network 106 for forwarding information to/from the mobile stations 106.

Figure 2:
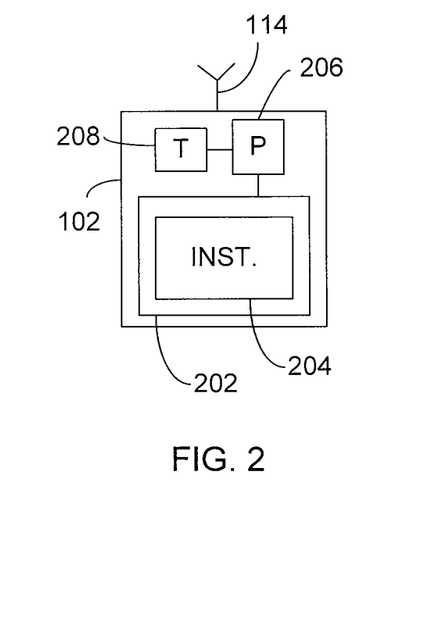
FIG. 2 illustrates an example of a mobile station for communicating in the wireless communication system of FIG. 1 in accordance with embodiments.

FIG. 2 illustrates an example of a mobile station 102. The mobile station 102 can include a memory 202 for storage of instructions 204 for execution on processing circuitry 206. The instructions 204 can comprise software configured to cause the mobile station 102 to perform actions for wireless communication between the mobile station 102 and the access point 118. The mobile station 102 can also include an RF transceiver 208 for transmission and reception of signals with the antenna 114.

In some examples, the mobile station 102 can be a personal digital assistant (PDA), a laptop or desktop computer with wireless communication capability, a web tablet, a net-book, a wireless telephone, a wireless headset, a pager, an instant messaging device, a digital camera, an access point, a television, a medical device (e.g., a heart rate monitor, a blood pressure monitor, etc.), or other device that can receive and/or transmit information wirelessly.

Figure 3:
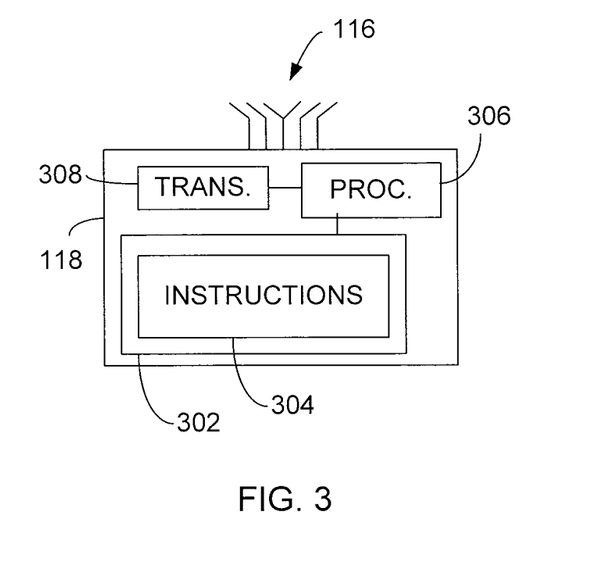
FIG. 3 illustrates an example of an access point for communicating in the wireless communication system of FIG. 1 in accordance with embodiments.

FIG. 3 illustrates an example of an access point 118. The access point 118 can include a memory 302 for storage of instructions 304 for execution on processing circuitry 306. The instructions 304 can comprise software configured to cause the access point 118 to perform actions for wireless communication between the mobile station 102 and the access point 118. The access point 118 can also include an RF transceiver 308 for transmission and reception of signals using the antenna array 116. The processing circuitry 306 can be configured to implement beamforming with the antenna array 116. In an example, the processing circuitry 306 can be configured to use the antenna array 116 to implement adaptive beamforming in a MU-MIMO system. That is, multiple beams can be implemented at the same time to different mobile stations 102. Moreover, the direction of each beam can change dynamically according to changes in the signal path to a given mobile station 102. The access point 118 can include a network switch, router, or hub for sending and receiving information with the communications network 106.

In an example, the mobile station 102 and access point 118 can be configured to operate in accordance with one or more frequency bands and/or standards profiles. For example, the mobile station 102 and access point 118 can be configured to communicate in accordance with specific communication standards, such as the Institute of Electrical and Electronics Engineers (IEEE) standards. In particular, the mobile station 102 can be configured to operate in accordance with one or more versions of the IEEE 802.11ac communication standard for MU-MIMO Wi-Fi.

In some examples, RF transceiver 208 and RF transceiver 308 can be configured to transmit and receive orthogonal frequency division multiplexed (OFDM) communication signals which comprise a plurality of orthogonal subcarriers. In broadband multicarrier examples, the mobile station 102 and access point 118 can be configured to communicate in accordance with an orthogonal frequency division multiple access (OFDMA) technique.

In other examples, the mobile station 102 and access point 118 can be configured to communicate using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation.

Figure 4:
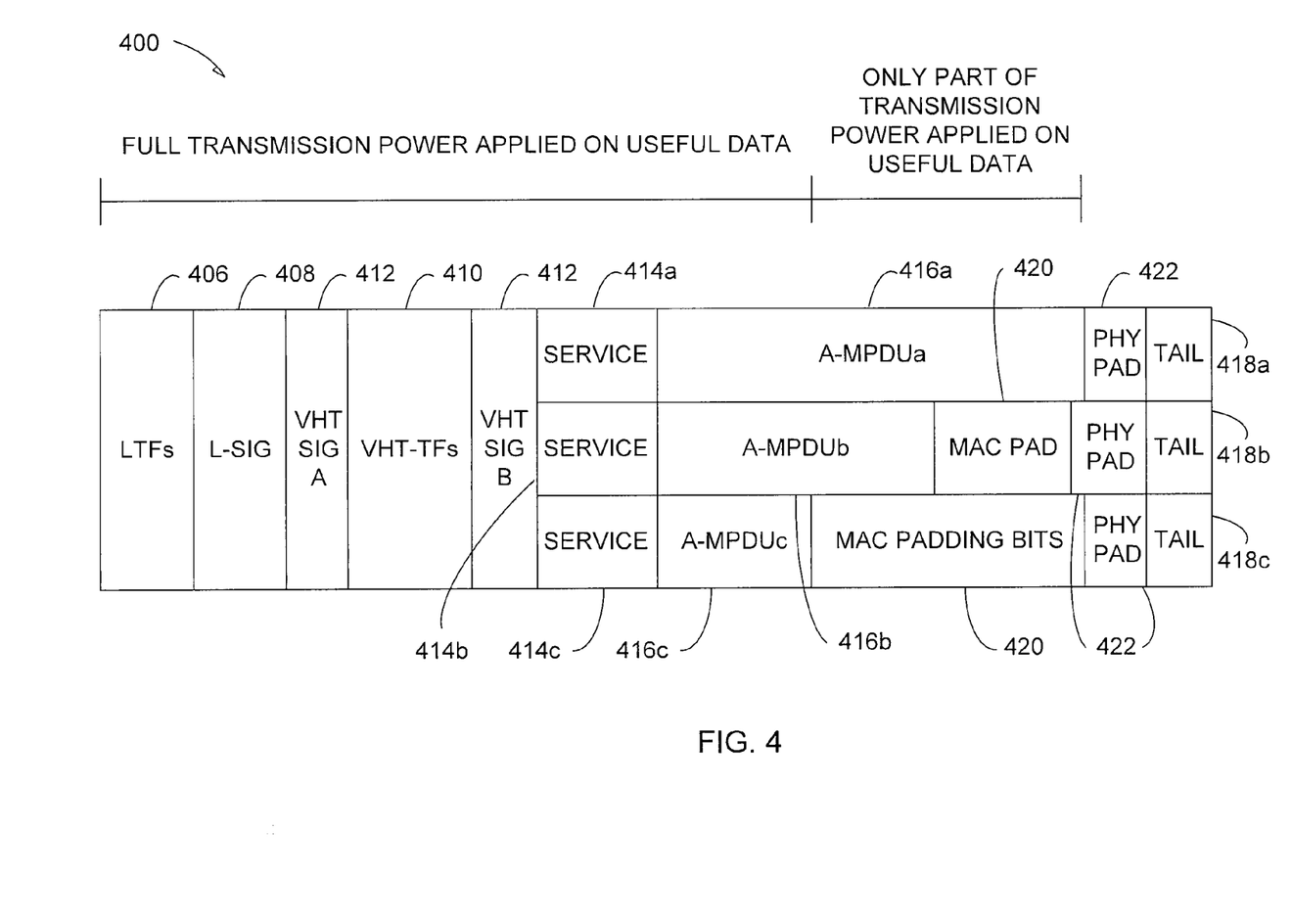
FIG. 4 illustrates an example frame for transmission by the access point of FIG. 1 in accordance with embodiments.

FIG. 4 illustrates an example physical layer (PHY) frame 400 for transmission by the access point 118 to multiple mobile stations 102 in a MU-MIMO implementation. In an example, the frame 400 is structured in accordance with the IEEE 802.11ac standard. The frame 400 includes one or more legacy training fields 406, legacy signaling fields 408, as well as one or more very high throughput (VHT) training fields 410, and one or more VHT signaling fields 412. The frame 400 also includes one or more frame headers 414a-c followed by one or more aggregated media access control (MAC) protocol data units (A-MPDU) 416a-c, and one or more tails 418a-c. The transmission of frame 400 can be, for example, over a single 20 Mhz primary channel and up to seven 20 Mhz channels according to the IEEE 802.11ac standard.

The training fields 406 and 410 can be used to transmit training signals to the mobile stations 102 for use by the mobile stations 102 to set parameters in their receivers and decoders. In some examples, the training fields 406, 410 can include long and/or short training fields. The signaling fields 408 and 412 can be used to transmit information regarding the decoding of the A-MPDUs 416a-c. For example, the signaling fields 408, 412 can contain information regarding the modulation and coding schemes (MCS) used to transmit the A-MPDUs 416a-c. The mobile stations 102 can then use the MCS information to properly receive and decode the A-MPDU 416a-c intended for them.

The A-MPDUs 416a-c comprise the encoded payload data for the frame 400. Here, the payload data for a given A-MPDU 416a-c comprises a plurality of MPDUs generated by the MAC layer. As shown, the frame 400 includes three A-MPDUs 416a-c, each A-MPDU 416a-c to be transmitted to a different mobile station 102. Accordingly, each A-MPDU 416a-c can comprise a plurality of MPDUs 416a-c generated from a data stream intended for a single mobile station 102.

In an example, the A-MPDUs 416a-c (as well as training fields 406, 410, frame headers 414a-c, tails 418a-c, signaling fields 408, 412), however, can be transmitted using beamforming to direct each A-MPDU 416a-c towards its intended recipient mobile station 102. Moreover, each A-MPDU 416a-c can be transmitted with a distinct beam such that multiple A-MPDUs 416a-c can be transmitted in parallel on the same set of frequency subcarriers. Furthermore, since each A-MPDU 416a-c can be independently transmitted in a distinct beam, each A-MPDU 416a-c can use a different MCS. Accordingly, the frame 400 of FIG. 4 illustrates time in the horizontal access and precoding in the vertical access such that different A-MPDUs 416a-c are transmitted on the same set of frequency subcarriers, but use different precoding to be transmitted on different beams to different mobile stations.

As shown, the frame 400 comprises a conventional frame transmitted without power loading. Accordingly, MAC layer padding bits 420 are used to align the terminations of each A-MPDU 416a-c. In an example, the MAC layer padding bits 420 can align the terminations to within one byte and physical layer padding bits 422 can be used to get exact bit alignment between the A-MPDUs 416a-c. As can be seen, the full transmission power of the access point 118 is applied on useful data for a portion of the frame 400, but while the MAC layer padding bits 420 are being transmitted, some of the transmission power is used to transmit the padding bits. Accordingly, only part of the transmission power is used on the useful data.

Figure 5:
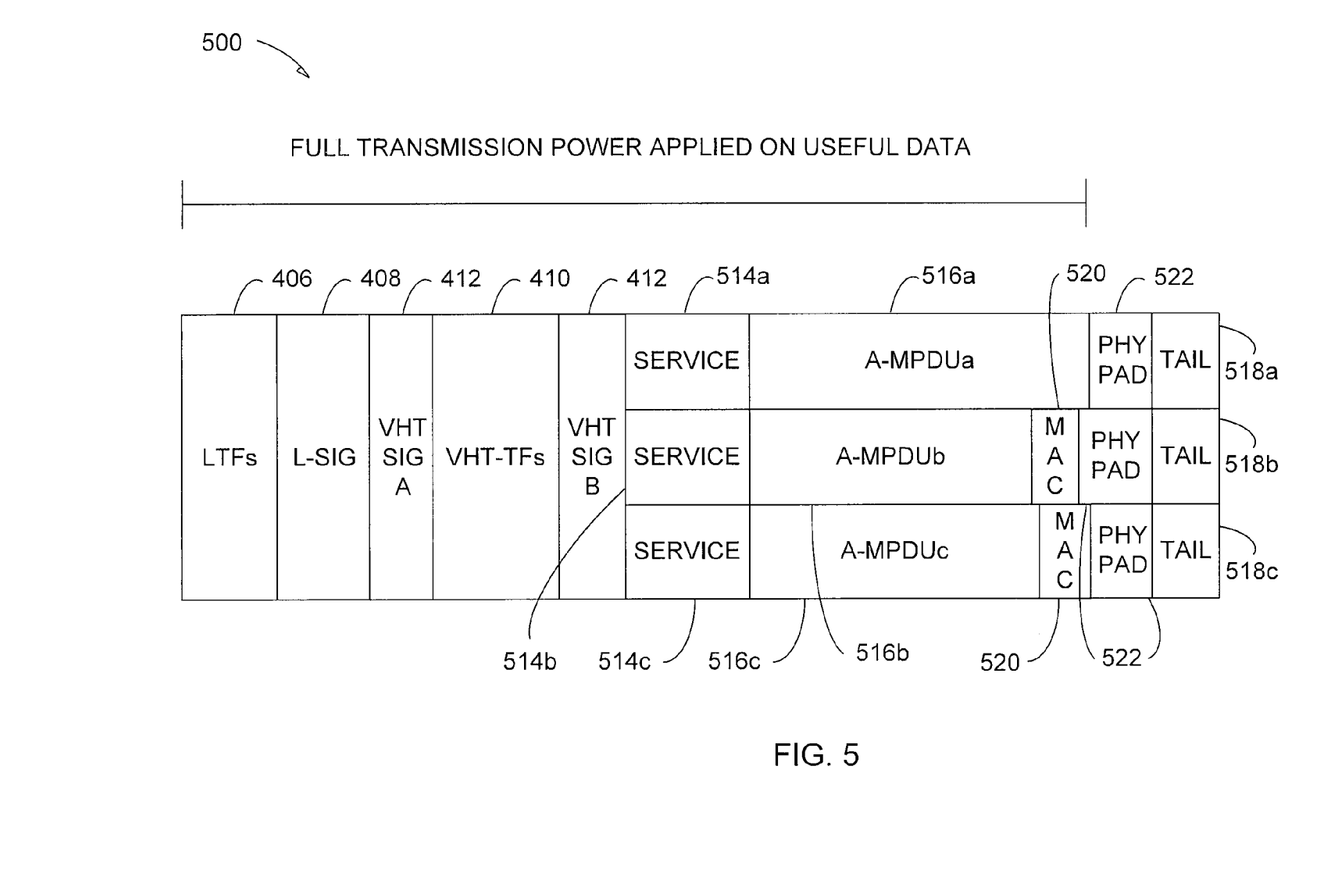
FIG. 5 illustrates an example frame for transmission by the access point of FIG. 1 using power loading in accordance with embodiments.

FIG. 5 illustrates another example frame 500 where power loading is used to align the terminations of the A-MPDUs 516a-c. Frame 500 includes the same fields as frame 400; legacy signaling fields 408, as well as one or more very high throughput (VHT) training fields 410, and one or more VHT signaling fields 412. Also the same as frame 400, frame 500 includes one or more frame headers 514a-c followed by one or more aggregated media access control (MAC) protocol data units (A-MPDU) 516a-c, and one or more tails 518a-c. Similar to frame 400, the transmission of frame 500 can be, for example, over a single 20 Mhz primary channel and up to seven 20 Mhz channels according to the IEEE 802.11ac standard. Additionally, the frame 500 of FIG. 5 illustrates time in the horizontal access and precoding in the vertical access such that different A-MPDUs 516a-c are transmitted on the same set of frequency subcarriers, but use different precoding to be transmitted on different beams to different mobile stations.

For comparison purposes, in the example frame 500, the A-MPDUs 516a-c are formed from the same payload data as the A-MPDUs 416a-c in frame 400. The A-MPDUs 516a-c, however, have terminations that are aligned with much less MAC layer padding bits 520 than the MAC layer padding bits 420 in frame 400. This is because the A-MPDUs 516a-c are power loaded and have their MCSs adjusted in order to align the terminations. Additionally, the overall length of frame 500 is less than frame 400 due to the power loading and MCS adjustment used. In an example, physical layer padding bits 522 can be used in frame 500 for padding less than one byte in length.

For comparison purposes, the A-MPDU 516a is formed from the same payload data as used to form A-MPDU 416a. Likewise, the A-MPDU 516b is formed from the same payload data as used to form A-MPDU 516b, and the A-MPDU 516c is formed from the same payload data as used to form A-MPDU 516c. As shown the A-MPDU 416a is the longest of the A-MPDUs 416a-c of frame 400. Thus, the length of the frame 400 is determined in part by the length of A-MPDU 416a. The A-MPDU 416b is in the middle for length and the A-MPDU 416c is the shortest of the three A-MPDUs 416a-c.

The frame 400 can be treated as a hypothetical frame generated by the access point 116. The hypothetical frame 400 can be used to determine the power loading and MCS to apply to the A-MPDUs in order to align the terminations of the A-MPDUs. In this hypothetical frame 400, each A-MPDU 416a-c is generated to be transmitted at the same power level.

Notably, however, the MCS of each A-MPDU 416*a-c* is determined based on a signal quality between the access point 118 and the mobile station 102 to which the respective A-MPDU416*a-c* would be transmitted. In this example, the A-MPDU 416*a* is intended for a first mobile station 102 and the signal quality between the access point 118 and the first mobile station 102 is poor, a more robust MCS would be used for the A-MPDU 416*a*. The A-MPDU 416*c* is intended for a third mobile station 102 having a good signal quality and the A-MPDU 416*c* has a correspondingly less robust MCS. The A-MPDU 416*b* is intended for a second mobile station 102 having a signal quality inbetween the first and third mobile stations 102, and the MCS for the A-MPDU 416*b* is correspondingly in-between robustness of the A-MPDU 416*a* and 416*c*.

The signal quality between the access point 118 and a mobile station 102 can correspond to the downlink (e.g., from the access point 118 to the mobile station 102), uplink (e.g., from the mobile station 102 to the access point 118) or a combination (e.g., an average) of the downlink and uplink signal qualities. In an example, the signal quality is based on an indication received from a mobile station 102 regarding the signal quality of a downlink signal sent from the access point 118. For example, the access point 118 can broadcast a sounding signal that can be received by one or more mobile stations 102. A mobile station 102 receiving the sounding signal can send a return signal having an indication of the signal quality of the sounding signal as received by the mobile station 102. In an example, the return signal from the mobile station 102 can provide a signal-to-noise ratio for the sounding signal. In another example, the return signal can provide a bit-error rate for the sounding signal. In still other examples, the mobile station 102 can process the sounding signal and determine a preferred MCS to be used by the access point 118. The mobile station 102 can then send the appropriate MCS to the access point 118 as a preferred MCS for the access point 118 to use for A-MPDU transmission to the mobile station 102.

In any case, in frame 400, when the A-MPDUs 416*a-c* are assigned to be transmitted with equal power, but the signal quality between the access point 118 and respective mobile stations 102 varies, the length of the A-MPDUs 416*a-c* will also vary. Accordingly, the A-MPDU 416*a* is the longest A-MPDU 416*a-c* since the A-MPDU corresponds to the mobile station 102 having the poorest signal quality and the access point 118, therefore, applies the most robust MCS to A-MPDU 416*a* as compared to the A-MPDUs 416*b* and 416*c*.

In order to align the terminations of the A-MPDUs 516*a-c*, the power is increased above the power level used for the A-MPDUs 416*a-c* in frame 400 for long A-MPDUs and the power level is decreased below the power level used in frame 400 for short A-MPDUs. Accordingly, the A-MPDU 516*a* has a higher power level than the A-MPDU 416*a*, the A-MPDU 516*c* has a lower power level than the A-MPDU 416*c*, and the A-MPDU 516*b* has the same power level as the A-MPDU 416*b* to maintain the same length.

Changing the power level enables the MCS to be changed which changes the length of an A-MPDU. Accordingly, in order to decrease the length of the A-MPDU 416*a*, the power level is increased which compensates for a decrease in the robustness of the MCS. With the higher power, the MCS can be made less robust which shortens the length of the A-MPDU 516*a* such that A-MPDU 516*a* is generated. Since the power level for the A-MPDU 516*a* was increased above the power level assigned to the A-MPDUs 416*a-c*, the total power (without any other changes) transmitted by the access point 118 would increase correspondingly. In order to maintain the same total power as frame 400, the power level for A-MPDU 416*c* can be decreased since the A-MPDU 416*c* has a short length. In order to compensate for the decreased power, the MCS for the A-MPDU 416*c* is made more robust and the length increases such that the A-MPDU 516*c* is generated. In this example, the A-MPDU 416*b* does not have its length changed, and the power level and MCS for 516*b* are the same as that for A-MPDU 416*b*.

In an example, the amount of increase in power level for the A-MPDU 516*a* (as compared to the A-MPDU 416*a*) can correspond to the amount of increase in robustness required for the MCS of the A-MPDU 516*a* in order to align the termination of the A-MPDU 516*a* with the terminations of the A-MPDU 516*b* and 516*c*. Thus, if a large increase in the MCS is needed a large power increase can also be applied. In an example, the relationship between the amount of MCS change per power level change is based on the structure of the receiver in the mobile station 102 (e.g., based on amount of power received). In an example, a 3 dB in the power level increase corresponds to 1-2 level decrease in MCS, where there are a total of 8 MCS levels (2-3 dB per MCS level).

In an example, the access point 118 determines the power levels and MCSs to be applied to each of the A-MPDUs 516*a-c* together. Accordingly, the access point 118 can manage the total power limiting the total increase in power on A-MPDUs 516*a-c* to equal the total decrease in power on other A-MPDUs 516*a-c* transmitted in the same frame. Moreover, the access point 118 can manage the MCSs for each A-MPDU 516*a-c* such that the length of each A-MPDU 516*a-c* is substantially the same. In an example, each A-MPDU 516*a-c* is the same length to within one byte. Notably, the length of each A-MPDU 516*a-c* is dependent upon not only the MCS, but also the amount of payload data provided by the MAC layer for the A-MPDU 516*a-c*. Moreover, since transmission power is not wasted on (as many) MAC layer padding bits 420, the overall length of the frame 500 can be reduced as compared to the frame 400.

In some examples, the access point 118 can send a notification of the length of and the MCS used for a given A-MPDU 516*a-c* in one or more of the VHT-signaling fields 412 corresponding to the given A-MPDU 516*a-c*. Accordingly, in some examples, the power loading and MCS adjustment can be transparent to the mobile station 102. The mobile station 102 merely receives the MCS used for the A-MPDU 516*a-c* to be received, and decodes the A-MPDU 516*a-c* using the MCS provided. Whether the MCS was increased or decreased is unknown and not needed by the mobile station 102. Additionally, the mobile station 102 does not need to know the power level for the A-MPDU 516*a-c*.

In an example, the power level and MCS for each A-MPDU in a frame are set on a frame-by-frame basis. Accordingly, a hypothetical length can be determined for all the A-MPDUs in a first frame. The hypothetical length can be determined using the same power level for each A-MPDU and the preferred MCSs received from the mobile stations 102 corresponding to the A-MPDUs. Based on the amount of data for each A-MPDU, the hypothetical length can be determined. These lengths can then be adjusted as described above by changes in power level and MCS one or more of the A-MPDUs. The same process can be repeated for the next frame based on the new payload data for the new A-MPDUs and the mobile stations 102 corresponding to these new A-MPDUs.

Figure 6:
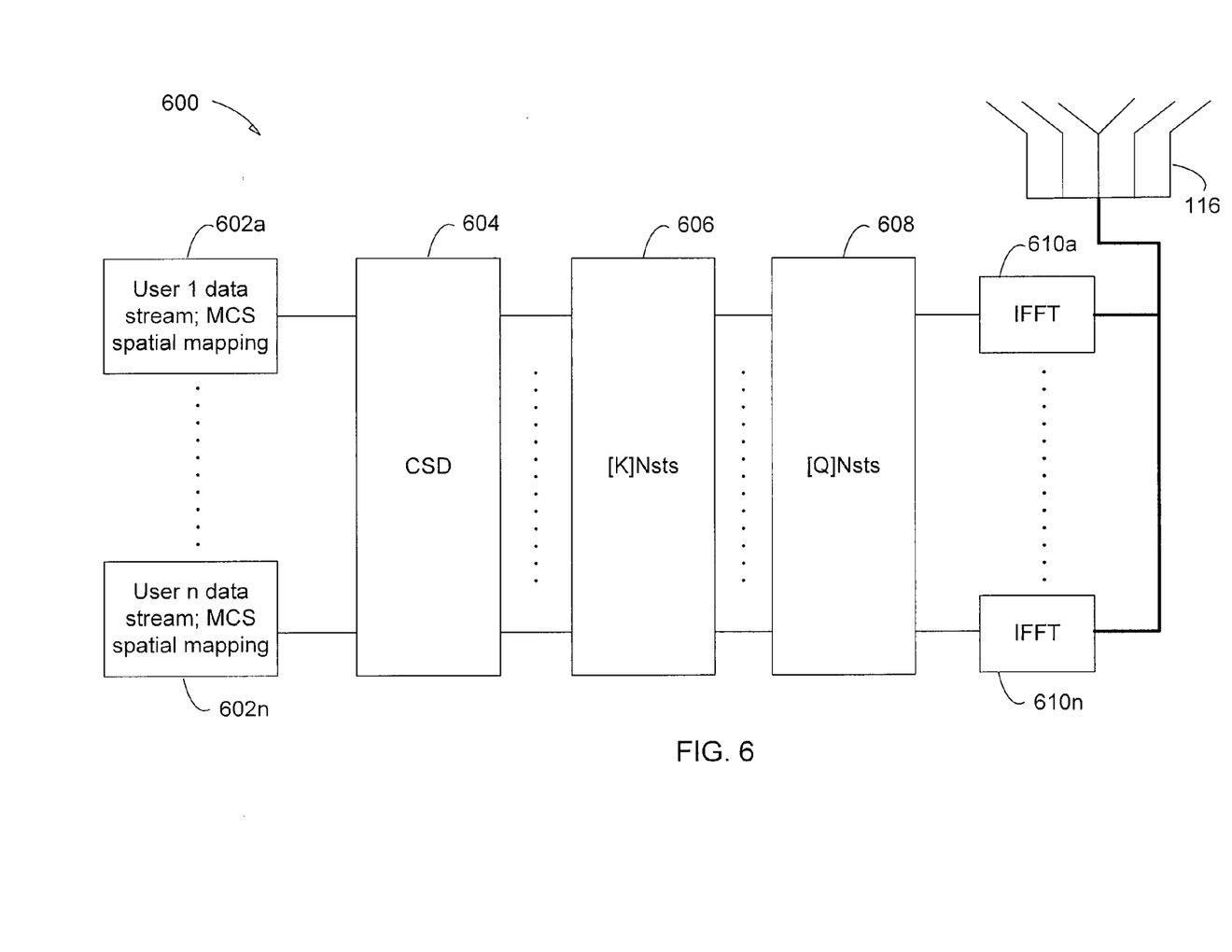
FIG. 6 illustrates an example block diagram for forming and transmitting a power loaded frame from the access point of FIG. 1 in accordance with embodiments.

FIG. 6 illustrates an example block diagram 600 for forming and transmitting the A-MPDUs 516*a-c* with power loading to align the terminations of the A-MPDUs 516*a-c*. Block diagram 600 illustrates forming A-MPDUs that correspond to the IEEE 802.11ac standard. At blocks 602*a-n* data streams (e.g., payload data from the MAC layer) for respective mobile stations a-n have respective MCSs applied in order to align terminations as describe above with respect to frame 500. Next, the data streams have a cyclic prefix added at block 604 in accordance with an orthogonal frequency multiplexing (OFDM) modulation scheme. At block 606, the K diagonal matrix is applied that corresponds to the power loading. The power level applied each data stream corresponds to the MCSs that was applied at block 602*a-n* for the respective data stream. At block 608, independent beams are formed for each data stream with a Q matrix that applies pre-coding to the data streams. The Q matrix comprises a plurality of Q vectors that are orthogonal to each other; one Q vector for each beam and each mobile station 102. At blocks 610*a-n*, each data stream processed by an inverse Fourier transform. Each data stream is then transmitted from the antenna array 116 with its beam and power level applied at blocks 606 and 608. Accordingly, the power level is set for each beam.

Figure 7:
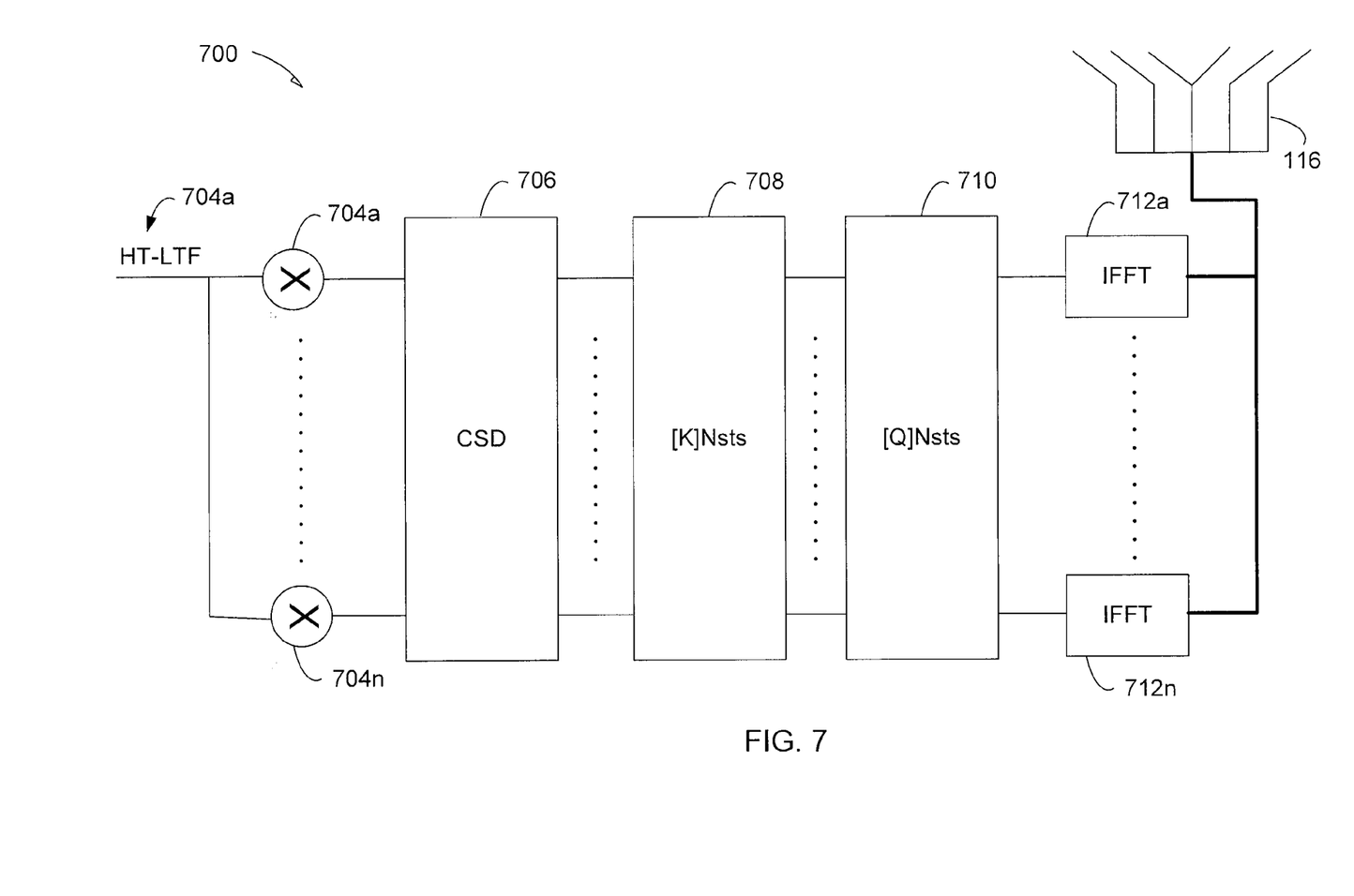
FIG. 7 illustrates an example block diagram for forming and transmitting a long training signal from the access point of FIG. 1 using the power loading applied in the frame of FIG. 6 in accordance with embodiments.

In an example, the power level within a data stream transmitted to a given mobile station *a-n* remains the same throughout the frame 500. For example, the VHT long training field 510 and/or other fields within frame 500 can be transmitted using a power level that matches the corresponding A-MPDU 516*a-c*. According, a first VHT long training field 510 intended for a first mobile station 102 can be transmitted at the power level set for the A-MPDU 516*a* which is also intended for the first mobile station 102. FIG. 7 illustrates an example block diagram 700 for forming and transmitting the VHT long training field 510 at the same power level as associated A-MPDUs 516*a-c*.

At block 702, a long training signal is input for the long training field 510. At blocks 704*a-n*, the long training signal is mapped into multiple data streams each having the long training signal for a given mobile station *a-n*. The mobile stations *a-n* with respect to the long training signal in block diagram 700 are the same mobile stations *a-n* for the A-MPDUs generated with block diagram 600. Since a single long training signal is mapped to all the mobile stations *a-n*, each long training signal has the same MCS applied thereto. In an example, each long training signal has the most robust MCS applied thereto in order to ensure accurate reception at the mobile stations *a-n*. At block 706, a cyclic prefix is added to the long training signal in accordance with an OFDM modulation scheme. At block 708, the respective power levels for each data stream are applied. The power levels applied at block 708 are the same as the power levels applied at block 606 of block diagram 600. At block 710, beams are formed for the data streams and, at block 712, inverse Fourier transforms are applied before transmitting the long training signals with the antenna array 116.

Embodiments may be implemented in one or a combination of hardware, firmware and software. Embodiments may also be implemented as instructions stored on a computer-readable medium, which may be read and executed by at least one processing circuitry to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for transmitting and receiving signals using multiple user multiple input multiple output (MU-MIMO), the system comprising:
    a processor;
    a memory;
    one or more RE transceivers;
    processing circuitry to:
        set a first power level for transmission of a first aggregated medium access control (MAC) protocol data unit (A-MPDU) corresponding to a first station as a function of an amount of payload data corresponding to the first A-MPDU;
        set a second power level for transmission of a second A-MPDU corresponding to a second station as a function of an amount of payload data corresponding to the second A-MPDU;
        wherein the amount of payload data corresponding to the first A-MPDU and the amount of a payload data corresponding to the second A-MPDU are different, and the first and second power levels are set to produce a similar length for the first A-MPDU and the second A-MPDU, and wherein the first and second A-MPDUs are both to be transmitted in a first frame.

2. The system of claim 1, wherein the first and second power levels are selected such that the length of the first A-MPDU is within one byte of the length of the second A-MPDU.

3. The system of claim 1, wherein the processing circuitry is to cause the transmission of the first and second A-MPDUs on the first frame.

4. The system of claim 1, wherein the processing circuitry is to:
    set a first modulation and coding scheme (MCS) for transmission of the first A-MPDU as a function of the first power level and the amount of payload data corresponding to the first A-MPDU; and
    set a second MCS for transmission of the second A-MPDU as a function of the second power level and the amount of payload data corresponding to the second A-MPDUs.

5. The system of claim 4, wherein the processing circuitry is to:
    determine a first signal quality for the first station;
    determine a second signal quality for the second station;
    wherein setting the first power level and the first MCS is also a function of the first signal quality for the first station and wherein setting the second power level and the second MCS is also a function of the second signal quality for the second station.

6. The system of claim 1, wherein the processing circuitry is to:
    adjust on a frame-by-frame basis, the power level for A-MPDUs corresponding to the first station as a function of the amount of payload data corresponding to the A-MPDUs of the first station;
    adjust on a frame-by-frame basis, the power level for A-MPDUs corresponding to the second station as a function of the amount of payload data corresponding to the A-MPDUs of the second station; and
    wherein the power level for A-MPDUs corresponding to the first station and the second station being set to produce similar length A-MPDUs corresponding to the first and second stations in each frame.

7. The system of claim 6, wherein a total power from frame-to-frame remains substantially constant.

8. The system of claim 1, wherein the processing circuitry is to:
calculate a first hypothetical length corresponding to the first A-MPDU based on the amount of payload data corresponding to the first A-MPDU encoded using a first hypothetical MCS, the first hypothetical MCS corresponding to a first signal quality;
calculate a second hypothetical length corresponding to the second A-MPDU based on the payload data corresponding to the second A-MPDU encoded using a second hypothetical MCS, the second hypothetical MCS corresponding to a second signal quality;
set at least one of: a first MCS to a less robust rate than the first hypothetical MCS, and a second MCS to a more robust rate than the second hypothetical MCS responsive to determining that the first hypothetical length is longer than the second hypothetical length;
wherein the first and second hypothetical MCSs correspond to respective signals transmitted at a third power level; and
set at least one of: the first power level higher than the third power level, and the second power level lower than the third power level responsive to determining that the first hypothetical length is longer than the second hypothetical length.

9. A non-transitory computer-readable medium, which stores instructions, which when performed by a computer, causes the computer to perform the operations comprising:
setting a first power level for transmission of a first aggregated medium access control (MAC) protocol data unit (A-MPDU) corresponding to a first station as a function of an amount of payload data corresponding to the first A-MPDU;
setting a second power level for transmission of a second A-MPDU corresponding to a second station as a function of an amount of payload data corresponding to the second A-MPDU; and
wherein the amount of payload data corresponding to the first A-MPDU and the amount of a payload data corresponding to the second A-MPDU are different, and the first and second power levels are set to produce a similar length for the first A-MPDU and the second A-MPDU, and wherein the first and second A-MPDUs are both to be transmitted in a first frame.

10. The non-transitory computer-readable medium of claim 9, wherein the operations comprise selecting the first and second power levels such that the length of the first A-MPDU is within one byte of the length of the second A-MPDU.

11. The non-transitory computer-readable medium of claim 9, wherein the operations comprise transmitting the first and second A-MPDUs on the first frame.

12. The non-transitory computer-readable medium of claim 9, wherein the operations comprise:
setting a first modulation and coding scheme (MCS) for transmission of the first A-MPDU as a function of the first power level and the amount of payload data corresponding to the first A-MPDU; and
setting a second MCS for transmission of the second A-MPDU as a function of the second power level and the amount of payload data corresponding to the second A-MPDUs.

13. The non-transitory computer-readable medium of claim 9, wherein the operations comprise:
determining a first signal quality for the first station;
determining a second signal quality for the second station; and
wherein setting the first power level and the first MCS is also a function of the first signal quality for the first station and wherein setting the second power level and the second MCS is also a function of the second signal quality for the second station.

14. The non-transitory computer-readable medium of claim 9, wherein the operations comprise:
adjusting on a frame-by-frame basis, the power level for A-MPDUs corresponding to the first station as a function of the amount of payload data corresponding to the A-MPDUs of the first station;
adjusting on a frame-by-frame basis, the power level for A-MPDUs corresponding to the second station as a function of the amount of payload data corresponding to the A-MPDUs of the second station;
wherein the power level for A-MPDUs corresponding to the first station and the second station being set to produce similar length A-MPDUs corresponding to the first and second stations in each frame.

15. The non-transitory computer-readable medium of claim 14, wherein a total power from frame-to-frame remains substantially constant.

16. The non-transitory computer-readable medium of claim 9 wherein the operations comprise:
calculating a first hypothetical length corresponding to the first A-MPDU based on the amount of payload data corresponding to the first A-MPDU encoded using a first hypothetical MCS, the first hypothetical MCS corresponding to a first signal quality;
calculating a second hypothetical length corresponding to the second A-MPDU based on the payload data corresponding to the second A-MPDU encoded using a second hypothetical MCS, the second hypothetical MCS corresponding to a second signal quality;
responsive to determining that the first hypothetical length is longer than the second hypothetical length, setting at least one of: a first MCS to a less robust rate than the first hypothetical MCS, and a second MCS to a more robust rate than the second hypothetical MCS;
wherein the first and second hypothetical MCSs correspond to respective signals transmitted at a third power level; and
responsive to determining that the first hypothetical length is longer than the second hypothetical length, setting at least one of: the first power level higher than the third power level, and the second power level lower than the third power level.

17. An apparatus for transmitting and receiving signals in a multiple user multiple input multiple output (MU-MIMO) system, the apparatus comprising:
processing circuitry configured to:
set a first power level for transmission of a first aggregated medium access control (MAC) protocol data unit (A-MPDU) corresponding to a first station as a function of an amount of payload data corresponding to the first A-MPDU;
set a second power level for transmission of a second A-MPDU corresponding to a second station as a function of an amount of payload data corresponding to the second A-MPDU;
wherein the amount of payload data corresponding to the first A-MPDU and the amount of a payload data corresponding to the second A-MPDU are different, and the first and second power levels are set to produce a similar length for the first A-MPDU and the second A-MPDU, and wherein the first and second A-MPDUs are both to be transmitted in a first frame.

18. The apparatus of claim 17, wherein the processing circuitry is configured to select the first and second power levels such that the length of the first A-MPDU is within one byte of the length of the second A-MPDU.

19. The apparatus of claim 17, wherein the circuitry is configured to:
- calculate a first hypothetical length corresponding to the first A-MPDU based on the amount of payload data corresponding to the first A-MPDU encoded using a first hypothetical MCS, the first hypothetical MCS corresponding to a first signal quality;
- calculate a second hypothetical length corresponding to the second A-MPDU based on the payload data corresponding to the second A-MPDU encoded using a second hypothetical MCS, the second hypothetical MCS corresponding to a second signal quality; and
- responsive to determining that the first hypothetical length is longer than the second hypothetical length, set at least one of: a first MCS to a less robust rate than the first hypothetical MCS, and a second MCS to a more robust rate than the second hypothetical MCS.

20. The apparatus of claim 19, wherein the first and second hypothetical MCSs correspond to respective signals transmitted at a third power level.

21. The apparatus of claim 20, wherein the circuitry is configured to:
- set at least one of: the first power level higher than the third power level, and the second power level lower than the third power level responsive to determining that the first hypothetical length is longer than the second hypothetical length.

22. The apparatus of claim 17, wherein the circuitry is configured to:
- adjust on a frame-by-frame basis, the power level for A-MPDUs corresponding to the first station as a function of the first signal quality and the amount of payload data corresponding to the A-MPDUs of the first station;
- adjust on a frame-by-frame basis, the power level for A-MPDUs corresponding to the second station as a function of the second signal quality and the amount of payload data corresponding to the A-MPDUs of the second station;
- wherein the power level for A-MPDUs corresponding to the first station and the second station being set to produce similar length A-MPDUs corresponding to the first and second stations in each frame.

23. The apparatus of claim 22, wherein the total power from frame-to-frame remains substantially constant.

24. The apparatus of claim 17, wherein the apparatus is an access point (AP).

* * * * *

UNITED STATES PATENT AND TRADEMARK OFFICE
CERTIFICATE OF CORRECTION

PATENT NO.         : 8,918,137 B2                                              Page 1 of 1
APPLICATION NO.    : 14/047524
DATED              : December 23, 2014
INVENTOR(S)        : Niu et al.

It is certified that error appears in the above-identified patent and that said Letters Patent is hereby corrected as shown below:

Title page, column 2, under (56) "Foreign Patent Documents", line 1, delete "102005002057" and insert --1020050020576--, therefor Title page, column 2, under (56) "Foreign Patent Documents", line 2, delete "102009004266" and insert --1020090042666--, therefor In the Claims In column 8, line 11, in Claim 1, delete "RE" and insert --RF--, therefor Signed and Sealed this
Twenty-second Day of September, 2015

Michelle K. Lee
*Director of the United States Patent and Trademark Office*